W. SCHRAMM.
CONSTANT SPEED WIND WHEEL.
APPLICATION FILED MAY 23, 1917.

1,287,116.

Patented Dec. 10, 1918.
2 SHEETS—SHEET 1.

INVENTOR
William Schramm
BY
Herbert H. Thompson
ATTORNEY.

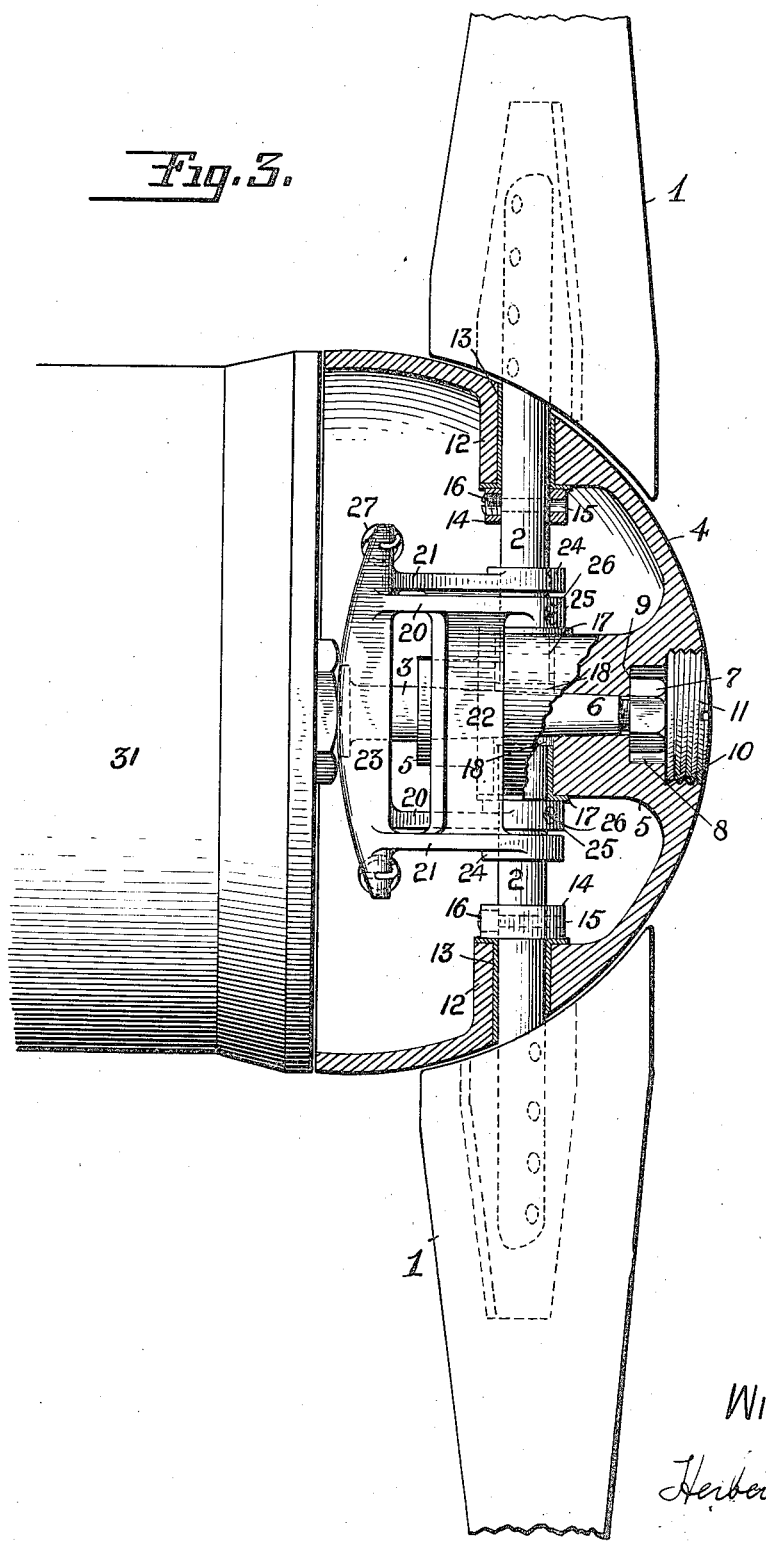

UNITED STATES PATENT OFFICE.

WILLIAM SCHRAMM, OF WEST HOBOKEN, NEW JERSEY, ASSIGNOR TO SPERRY GYROSCOPE COMPANY, OF BROOKLYN, NEW YORK, A CORPORATION OF NEW YORK.

CONSTANT-SPEED WIND-WHEEL.

1,287,116.   Specification of Letters Patent.   Patented Dec. 10, 1918.

Application filed May 23, 1917. Serial No. 170,353.

*To all whom it may concern:*

Be it known that I, WILLIAM SCHRAMM, a subject of the Emperor of Germany, residing at 392 Kerrigan avenue, West Hoboken, in the county of Hudson and State of New Jersey, have invented certain new and useful Improvements in Constant-Speed Wind-Wheels, of which the following is a specification.

My invention relates to windwheels, more particularly of the type adapted to maintain a practically uniform speed regardless of the velocity of the driving wind.

One of the principal objects of the present invention is to provide a reliable constant speed windwheel of a few number of parts whereby it will occupy only a small space and can be made of small weight.

Other objects and advantages will appear as the invention is hereinafter disclosed.

Referring to the drawings in which is illustrated what I now consider the preferred form of my invention:

Fig. 3 is a plan view, partly broken away, showing a windwheel, embodying my invention, in driving connection with an electric generator.

Figure 1:
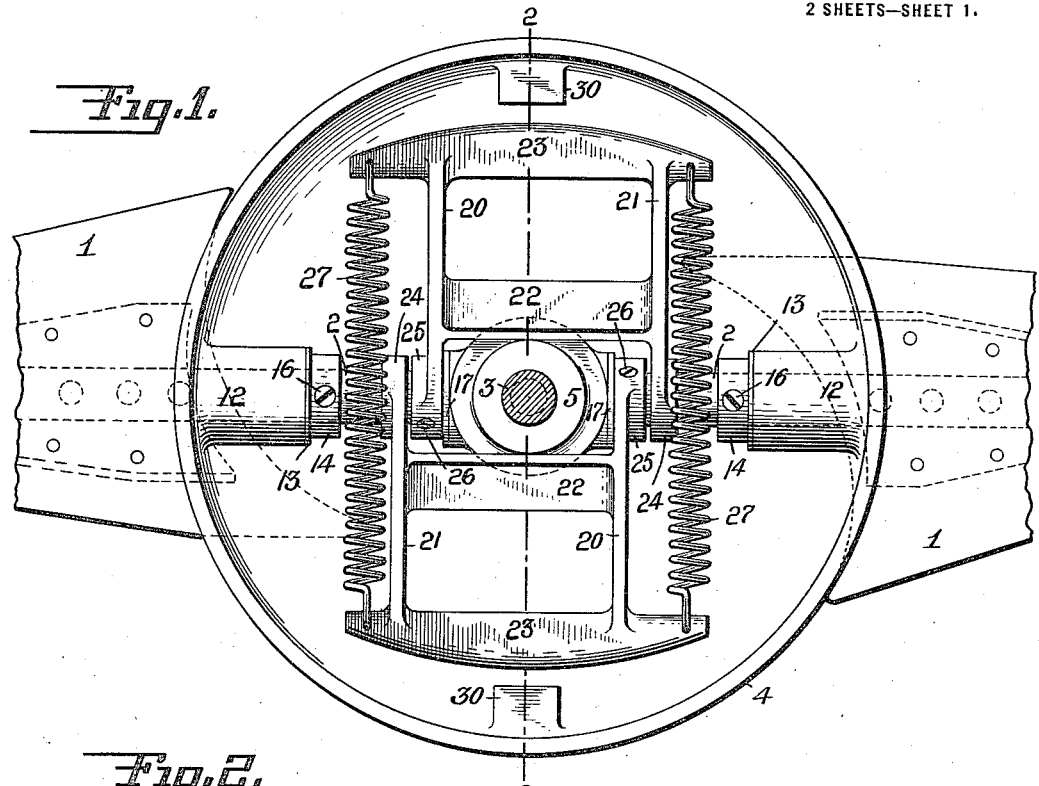
Figure 1 is a rear elevation of a structure embodying my invention, the generator shown in another of the views being omitted.

The embodiment of my invention illustrated comprises a plurality of blades and means actuated by centrifugal force for changing the pitch of said blades on a variation in speed of revolution of the blades. The blades 1, 1 are shown fixed on spindles 2, 2 adapted to oscillate about their longitudinal axes, and suitably connected for revolution about the shaft 3. This connection may assume the form shown in which a hollow gong-shaped hub 4 is secured to the shaft 3 by seating the sleeve 5 of said hub on a tapered portion 6 of the said shaft 3. The hub 4 may be retained on said tapered portion 6 by a nut 7 entered in a recess 8, provided in said hub, and screwed on the threaded end of the shaft 3 until it engages the shoulder 9 of the hub. The recess 8 may be provided with an enlarged threaded portion 10 into which a screw 11 is inserted. This screw 11 is shown as curved at its outer end to conform to the configuration of the outer surface of the hub 4 and thus performs not only the function of securely locking the nut 7 in place but also in sealing up the depression which would otherwise occur in the surface of the hub. The hub 4 may be provided with inwardly projecting sleeve portions 12, 12 in which may be mounted flanged bushings 13, 13 forming bearings for the spindles 2, 2.

Means are also provided for preventing outward radial movement of the blades 1, 1. This means may assume the form of two collars 14, 14 each of which may be secured to its corresponding spindle 2 by means of pins 15, 15 which may be inserted in registering openings provided in the spindles 2, 2 and collars 14, 14. To prevent accidental derangement of these pins 15, 15 they may be provided at one end with screw-threaded portions 16, 16 adapted to engage threads provided in the collars 14, 14. The ends of the spindles 2, 2 remote from the blades 1, 1 may be journaled in bushings 17, 17, similar to bushings 13, 13 and inserted in openings 18, 18 provided in the sleeve 5.

By virtue of the structure thus far described it will be readily observed that the blades 1, 1 are revoluble with the shaft 3, are capable of oscillating about their own longitudinal axes, and are fixed against outward radial movement with respect to the shaft.

As has been previously stated mechanism is provided for changing the pitch of the blades on a variation in angular velocity thereof. This mechanism is shown in the form of two weighted arms which are shown as H-shaped in form. The two legs 20, 21, 20 and 21 of the arms are joined at their intermediate portions by cross-pieces 22, 22 and at their outer, free ends by the fly-weights 23, 23. The ends of the arms opposite the weights are shown as provided with sleeves 24, 24, 25, 25, loosely surrounding the spindles 2, 2. Each of the weighted arms is shown adjustably fixed to a corresponding one of the spindles 2, 2, by means of a set screw 26 mounted in each of the sleeves 25, 25. Obviously the arms may be manually adjusted, by loosening the set-screws, with respect to the spindles and with respect to each other but it should be borne in mind that after the arms are so adjusted they are fixedly secured to the spindles and hence to the blades.

Resilient means in the form of springs 27, 27 are provided and connect the arms 20 and 21. It is to be noted that the springs are so arranged that they act directly along the line of application of centrifugal force on the fly-weights 23, 23. It should also be noted that the minimum angle between the arms 20 and 21 (see Fig. 2) is shown as being greater than 90°. This specific arrangement while not essential has been found to increase greatly the reliability of the device. The sleeves 25, 25 besides accomplishing the functions hereinafter pointed out serve also to prevent inward radial movement of the spindles 2, 2 so that the latter are locked against radial movement of any kind.

Figure 2:
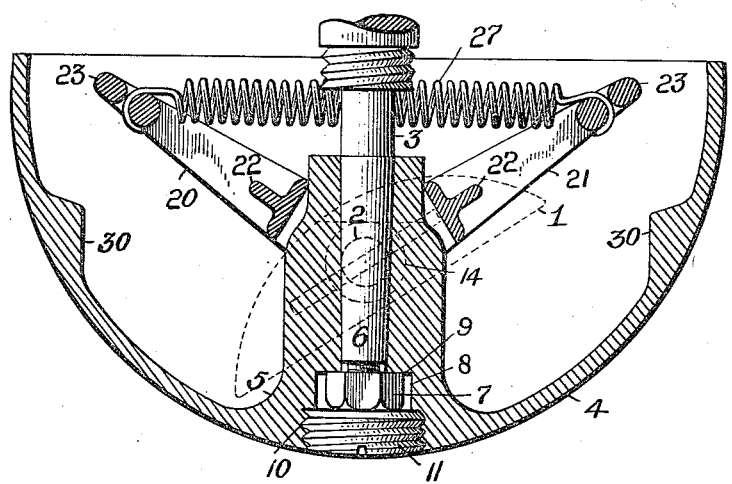
Fig. 2 is a section taken on the line 2—2 of Fig. 1.

Suitable stop means are provided for limiting the movement of the weighted arms. Thus lugs 30, 30 may be provided on the interior of the hub 4 to limit the outward movement of the arms and the inward movement of the latter may be limited by the engagement of the cross-pieces 22, 22 with the sleeve 5, as shown in Fig. 2.

The operation of my improved windwheel is substantially as follows. Assuming that the parts have been designed and adjusted for a predetermined speed and that the wind is blowing in the direction of the arrow in Fig. 2, the wind causes the wheel to revolve up to this predetermined speed. If the power of the wind increases the resulting increase in speed of the wheel causes the flyweights 23, 23 to move farther away from the shaft 3, thus causing the blades to assume a position more nearly parallel to the direction of the wind. The speed of the wheel is thus brought down to the predetermined amount. If, on the other hand, the power of the wind decreases the flyweights 23, 23 move toward the shaft 3, thus increasing the angle between the blades and the direction of the wind so that the wheel will be brought up to the predetermined speed.

My wheel is capable of numerous applications as for example driving a generator 31 coupled to the shaft 3, the whole set being used on an aeroplane. The device possesses marked advantages in the above mentioned application as, due to its extreme simplicity and few number of parts it may be made of light weight without sacrificing any advantage in reliability of operation. None of the operating parts except the blades and smooth rounded hub are exposed to the wind so that minimum resistance is offered to the forward movement of aeroplane.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A windwheel comprising a shaft, a pair of blades, means, comprising a spindle, connecting each blade with said shaft, a weighted arm connected to each spindle and means for preventing said arms from assuming a position in which the angle between them is less than ninety degrees.

2. In combination, a shaft, a hollow hub carried by said shaft, a plurality of blades carried by said hub, means for preventing radial movement of said blades with respect to said hub but permitting oscillation of each blade about its longitudinal axis and means comprising weighted arms fixedly connected to said blades and mounted within said hub for varying the pitch of said blades as the power of the driving wind varies.

3. In combination, an inclosed generator, a plurality of radial spindles rotatably but non-slidably mounted on the shaft of said generator, a blade carried by each spindle, a plurality of weighted arms each fixedly connected to a corresponding one of said spindles, resilient means for controlling the position of said arms and a dome-shaped member, whose largest external diameter is substantially the same as that of the casing of said generator, carried by said generator shaft.

4. In combination, a cylindrical generator-inclosing casing from which the generator shaft projects, a dome-shaped hub whose largest diameter is substantially the same as that of said casing, a plurality of spindles rotatably but non-slidably mounted in said hub, a plurality of weighted arms each fixedly secured to a corresponding one of said spindles, within said hub, a blade secured to each spindle exteriorly of said hub and resilient means within said hub for controlling the position of said arms, said hub being secured to said shaft.

5. In combination, a shaft, a dome shaped casing carried by said shaft, a plurality of blades rotatably carried by said shaft, a plurality of weighted arms each fixedly connected to a corresponding one of said blades and confined within said casing and resilient means operatively connected to said arms.

In testimony whereof I have affixed my signature.

WILLIAM SCHRAMM.